United States Patent
May et al.

(10) Patent No.: US 8,337,928 B2
(45) Date of Patent: *Dec. 25, 2012

(54) ANISIC ACID MODIFIED STEVIOL GLYCOSIDE SWEETENED BEVERAGE PRODUCTS

(75) Inventors: Ryan May, Mahwah, NJ (US); Glenn Roy, Beacon, NY (US); Thomas Lee, Scarsdale, NY (US)

(73) Assignee: Concentrate Manufacturing Company Of Ireland, Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/330,738

(22) Filed: Dec. 20, 2011

(65) Prior Publication Data

US 2012/0088013 A1   Apr. 12, 2012

Related U.S. Application Data

(63) Continuation of application No. 11/686,234, filed on Mar. 14, 2007, now Pat. No. 8,084,073.

(51) Int. Cl.
*A23L 2/00* (2006.01)
(52) U.S. Cl. ........................ 426/590; 426/597
(58) Field of Classification Search ............ 426/590
See application file for complete search history.

(56) References Cited

U.S. PATENT DOCUMENTS

| | | |
|---|---|---|
| 3,296,079 A | 1/1967 | Griffin |
| 3,531,296 A | 9/1970 | Smithies |
| 4,082,858 A | 4/1978 | Morita et al. |
| 4,361,697 A | 11/1982 | Dobberstein et al. |
| 4,612,942 A | 9/1986 | Dobberstein et al. |
| 4,738,856 A | 4/1988 | Clark |
| 4,830,870 A | 5/1989 | Davis, Jr. et al. |
| 4,870,059 A | 9/1989 | Mitsuhashi et al. |
| 4,902,525 A | 2/1990 | Kondou |
| 4,956,191 A | 9/1990 | Ueda et al. |
| 4,959,225 A | 9/1990 | Wong et al. |
| 4,990,354 A | 2/1991 | Bakal et al. |
| 4,992,279 A | 2/1991 | Palmer et al. |
| 4,996,196 A | 2/1991 | Mitsuhashi et al. |
| 5,013,716 A | 5/1991 | Cherukuri et al. |
| 5,059,428 A | 10/1991 | Wong et al. |
| 5,059,429 A | 10/1991 | Cherukuri et al. |
| 5,106,644 A | 4/1992 | El-Nokaly |
| 5,219,842 A | 6/1993 | Okada et al. |
| 5,411,755 A | 5/1995 | Downton et al. |
| 5,411,775 A | 5/1995 | Wilson |
| 5,417,994 A | 5/1995 | Chang et al. |
| 5,433,965 A | 7/1995 | Fischer et al. |
| 5,437,880 A | 8/1995 | Takaichi et al. |
| 5,464,619 A | 11/1995 | Kuznicki et al. |
| 5,480,667 A | 1/1996 | Corrigan et al. |
| 5,631,038 A | 5/1997 | Kurtz et al. |
| 5,637,618 A | 6/1997 | Kurtz et al. |
| 5,643,956 A | 7/1997 | Kurtz et al. |
| 5,646,122 A | 7/1997 | Kurtz et al. |
| 5,650,403 A | 7/1997 | Kurtz et al. |
| 5,654,311 A | 8/1997 | Kurtz et al. |
| 5,665,755 A | 9/1997 | Kurtz et al. |
| 5,681,569 A | 10/1997 | Kuznicki et al. |
| 5,700,792 A | 12/1997 | Kurtz et al. |
| 5,703,053 A | 12/1997 | Kurtz et al. |
| 5,780,086 A | 7/1998 | Kirksey et al. |
| 5,827,560 A | 10/1998 | Fu et al. |
| 5,830,523 A | 11/1998 | Takaicki et al. |
| 5,866,608 A | 2/1999 | Kurtz et al. |
| 5,895,672 A | 4/1999 | Cooper |
| 5,916,881 A | 6/1999 | Okada et al. |
| 6,007,856 A | 12/1999 | Cox et al. |
| 6,008,250 A | 12/1999 | Kurtz et al. |
| 6,010,734 A | 1/2000 | Whelan et al. |
| 6,015,792 A | 1/2000 | Kurtz et al. |
| 6,054,168 A | 4/2000 | Lioutas et al. |
| 6,083,549 A | 7/2000 | Harada et al. |
| 6,132,787 A | 10/2000 | Bunger et al. |
| 6,136,356 A | 10/2000 | Bunger et al. |
| 6,180,155 B1 | 1/2001 | Lotz et al. |
| 6,255,557 B1 | 7/2001 | Brandle |
| 6,265,012 B1 | 7/2001 | Shamil |
| 6,361,812 B1 | 3/2002 | Ekanayake et al. |
| 6,375,992 B1 | 4/2002 | Blumenstein-Stahl et al. |
| 6,376,005 B2 | 4/2002 | Bunger et al. |
| 6,391,864 B1 | 5/2002 | Stone |
| 6,413,561 B1 | 7/2002 | Sass et al. |
| 6,416,806 B1 | 7/2002 | Zhou |
| 6,432,464 B1 | 8/2002 | Anderson et al. |
| 6,432,470 B2 | 8/2002 | Chaen et al. |

(Continued)

FOREIGN PATENT DOCUMENTS

CN   1390501   1/2003

(Continued)

OTHER PUBLICATIONS

European Commission Scientific Committee of Food (Jun. 1999). Opinion on Stevioside as a Sweetener <http://www.food.gov.uk/multimedia/pdfs/stevioside.pdf>.

(Continued)

*Primary Examiner* — D. Lawrence Tarazano
*Assistant Examiner* — Jenna A Watts
(74) *Attorney, Agent, or Firm* — Banner & Witcoff, Ltd.

(57) ABSTRACT

Taste of a non-nutritive steviol glycoside sweetener is improved by using anisic acid in an amount sufficient to mask the metallic aftertaste of the non-nutritive steviol glycoside sweetener when the sweetener is contained in a beverage, beverage concentrate or syrup, or reduced calorie sweetener.

20 Claims, No Drawings

U.S. PATENT DOCUMENTS

| | | |
|---|---|---|
| 6,432,929 B1 | 8/2002 | Stone |
| 6,544,577 B1 | 4/2003 | Chu et al. |
| 6,558,723 B2 | 5/2003 | Ekanayake et al. |
| 6,589,555 B2 | 7/2003 | Pandya |
| 6,599,553 B2 | 7/2003 | Kealey et al. |
| 6,616,955 B2 | 9/2003 | Nunes et al. |
| 6,632,449 B2 | 10/2003 | Niehoff |
| 6,652,901 B2 | 11/2003 | Ishii |
| 6,682,766 B2 | 1/2004 | Blumenstein-Stahl et al. |
| 6,703,056 B2 | 3/2004 | Mehansho et al. |
| 6,706,295 B2 | 3/2004 | Mehansho et al. |
| 6,749,879 B2 | 6/2004 | Broz |
| 6,749,881 B2 | 6/2004 | Kataoka et al. |
| 6,759,067 B1 | 7/2004 | Ogasawara et al. |
| 6,759,073 B2 | 7/2004 | Heisey et al. |
| 6,780,443 B1 | 8/2004 | Nakatsu et al. |
| 6,783,789 B2 | 8/2004 | Mutilangi et al. |
| 6,794,375 B2 | 9/2004 | Sarama et al. |
| 6,821,545 B2 | 11/2004 | Bernhardt et al. |
| 6,838,106 B2 | 1/2005 | Kumamoto et al. |
| 6,838,107 B1 | 1/2005 | Bakal et al. |
| 6,838,109 B2 | 1/2005 | Nunes et al. |
| 6,890,567 B2 | 5/2005 | Nakatsu et al. |
| 6,899,901 B2 | 5/2005 | Nakatsu et al. |
| 6,984,376 B2 | 1/2006 | Stephenson et al. |
| 6,986,906 B2 | 1/2006 | Selzer et al. |
| 7,029,717 B1 | 4/2006 | Ojima et al. |
| 7,033,629 B2 | 4/2006 | Koss et al. |
| 7,052,725 B2 | 5/2006 | Chang et al. |
| 7,056,548 B2 | 6/2006 | Ogura et al. |
| 7,090,883 B2 | 8/2006 | Phipps |
| 7,105,190 B2 | 9/2006 | Ekanayake et al. |
| 7,781,005 B2 | 8/2010 | Mori |
| 2002/0004092 A1 | 1/2002 | Riha, III et al. |
| 2002/0122847 A1 | 9/2002 | Nunes et al. |
| 2002/0132037 A1 | 9/2002 | Zhou |
| 2002/0160090 A1 | 10/2002 | Lee et al. |
| 2002/0197371 A1 | 12/2002 | Lee et al. |
| 2003/0003212 A1 | 1/2003 | Chien et al. |
| 2003/0026872 A1 | 2/2003 | Dake et al. |
| 2003/0035875 A1 | 2/2003 | Dulebohn et al. |
| 2003/0059511 A1 | 3/2003 | Ishii |
| 2003/0096047 A1 | 5/2003 | Riha, III et al. |
| 2003/0190396 A1 | 10/2003 | Merkel et al. |
| 2003/0211214 A1 | 11/2003 | Riha, III et al. |
| 2003/0224095 A2 | 12/2003 | DuBois et al. |
| 2003/0236399 A1 | 12/2003 | Zheng et al. |
| 2004/0022914 A1 | 2/2004 | Allen |
| 2004/0076728 A2 | 4/2004 | Merkel et al. |
| 2004/0115329 A1 | 6/2004 | Tamiya et al. |
| 2004/0151771 A1 | 8/2004 | Gin et al. |
| 2004/0170735 A2 | 9/2004 | Merkel et al. |
| 2004/0197453 A1 | 10/2004 | Hirao et al. |
| 2004/0247669 A1 | 12/2004 | Gin et al. |
| 2005/0069616 A1 | 3/2005 | Lee et al. |
| 2005/0106305 A1 | 5/2005 | Abraham et al. |
| 2005/0136169 A1 | 6/2005 | Haung et al. |
| 2005/0152997 A1 | 7/2005 | Selzer et al. |
| 2005/0158444 A1 | 7/2005 | Koski |
| 2005/0208192 A1 | 9/2005 | Nakakura et al. |
| 2005/0220964 A1 | 10/2005 | Rizo et al. |
| 2005/0226983 A1 | 10/2005 | Bakal et al. |
| 2005/0260328 A1 | 11/2005 | Lutz et al. |
| 2006/0019019 A1 | 1/2006 | Rohaly et al. |
| 2006/0034873 A1 | 2/2006 | Radke et al. |
| 2006/0034897 A1 | 2/2006 | Boghani et al. |
| 2006/0068072 A9 | 3/2006 | Lee et al. |
| 2006/0068073 A1 | 3/2006 | Catani et al. |
| 2006/0073254 A1 | 4/2006 | Catani et al. |
| 2006/0083838 A1 | 4/2006 | Jackson et al. |
| 2006/0093720 A1 | 5/2006 | Tatz |
| 2006/0099309 A1 | 5/2006 | Mattson et al. |
| 2006/0099318 A1 | 5/2006 | Iwasaki et al. |
| 2006/0127450 A1 | 6/2006 | Chinen |
| 2006/0134291 A1 | 6/2006 | Rathjen |
| 2006/0134292 A1 | 6/2006 | Abelyan et al. |
| 2006/0134294 A1 | 6/2006 | McKee et al. |
| 2006/0142555 A1 | 6/2006 | Jonnala et al. |
| 2006/0159818 A1 | 7/2006 | Kunieda |
| 2006/0159820 A1 | 7/2006 | Rathjen et al. |
| 2006/0177559 A1 | 8/2006 | Gosselin et al. |
| 2006/0204550 A1 | 9/2006 | Hassen |
| 2008/0226770 A1 | 9/2008 | Lee et al. |
| 2008/0226773 A1 | 9/2008 | Lee et al. |
| 2008/0226776 A1 | 9/2008 | Roy et al. |
| 2008/0226787 A1 | 9/2008 | Johnson et al. |
| 2008/0226788 A1 | 9/2008 | Chang et al. |
| 2008/0226789 A1 | 9/2008 | Roy et al. |
| 2008/0226790 A1 | 9/2008 | Johnson et al. |
| 2008/0226793 A1 | 9/2008 | Chang et al. |
| 2008/0226794 A1 | 9/2008 | Bell et al. |
| 2008/0226795 A1 | 9/2008 | May et al. |
| 2008/0226796 A1 | 9/2008 | Lee et al. |
| 2008/0226797 A1 | 9/2008 | Lee et al. |
| 2008/0226798 A1 | 9/2008 | Talebi et al. |
| 2008/0226799 A1 | 9/2008 | Lee et al. |
| 2008/0226800 A1 | 9/2008 | Lee et al. |
| 2008/0226802 A1 | 9/2008 | Lee et al. |
| 2008/0226803 A1 | 9/2008 | Letourneau et al. |
| 2008/0226804 A1 | 9/2008 | Talebi et al. |
| 2009/0074935 A1 | 3/2009 | Lee et al. |
| 2009/0162484 A1 | 6/2009 | Bell et al. |
| 2009/0162487 A1 | 6/2009 | Bell et al. |
| 2009/0162488 A1 | 6/2009 | Bell et al. |
| 2010/0112138 A1 | 5/2010 | Roy et al. |

FOREIGN PATENT DOCUMENTS

| | | |
|---|---|---|
| JP | 7031407 | 2/1995 |
| JP | 2006-223104 | 8/2006 |
| KR | 2006079781 | 7/2006 |
| WO | 0069282 | 11/2000 |
| WO | 2005112668 | 12/2005 |
| WO | 2006072921 | 7/2006 |
| WO | 2006095366 | 9/2006 |
| WO | 2006127935 | 11/2006 |

OTHER PUBLICATIONS

International Programme on Chemical Safety World Health Organization, Safety Evaluation of Certain Food Additives, WHO Food Additives Series: 42, Prepared by the Fifty-first meeting of the Joint FAO/WHO Expert Committee on Food Additives (JECFA), World Health Organization, Geneva, 1999, IPCS—International Programme on Chemical Safety, Stevioside, First draft prepared by Dr. Josef Schlatter, Swiss Federal Office of Public Health, Switzerland. <http://www.inchem.org/documents/jecfa/jecmono/v042je07.htm>.

International Search Report for PCT/US2008/056984, dated Jul. 8, 2008.

Japanese Patent Application 2009-553800, Office Action dated Jul. 12, 2011.

Japanese Patent Application 2009-553800, Office Action dated Jun. 19, 2012.

ANISIC ACID MODIFIED STEVIOL GLYCOSIDE SWEETENED BEVERAGE PRODUCTS

RELATED APPLICATION

This application is a continuation of U.S. patent application Ser. No. 11/686,234, filed Mar. 14, 2007, U.S. Pat. No. 8,084,073, entitled "Anisic Acid Modified Steviol Glycoside Sweetened Beverage Products." The above mentioned application is incorporated herein by reference in its entirety.

FIELD OF THE INVENTION

This invention relates to beverages and other beverage products, such as beverage concentrates, etc. and sweeteners. In particular, this invention relates to beverages and other beverage products and sweeteners having formulations incorporating non-nutritive sweeteners and being suitable to meet market demand for alternative nutritional characteristics or flavor profiles.

BACKGROUND

It has long been known to produce beverages of various formulations. Improved and new formulations are desirable to meet changing market demands. In particular, there is perceived market demand for beverages having alternative nutritional characteristics, including, for example, alternative calorie content. Also, there is perceived market demand for beverages having alternative flavor profiles, including good taste and mouthfeel. In addition, there is consumer interest in beverages and other beverage products, such as beverage concentrates, etc. whose formulations make greater use of natural ingredients, that is, ingredients distilled, extracted, concentrated or similarly obtained from harvested plants and other naturally occurring sources, with limited or no further processing.

The development of new beverage formulations, for example, new beverage formulations employing alternative sweeteners, flavorants, flavor enhancing agents and the like, presents challenges in addressing associated bitterness and/or other off-tastes. In addition, such challenges typically are presented in new beverage formulations developed for alternative nutritional and/or flavor profiles. Also, there is need for new beverage formulations which can satisfactorily meet the combination of objectives including nutritional characteristics, flavor, shelf life, and other objectives.

Development of new beverage formulations has faced obstacles. For example, U.S. Pat. No. 4,956,191 suggests that carbonated beverages which contain blends of saccharin or Stevia extract with aspartame tend to be less organoleptically pleasing than those containing sugar.

It is therefore an object of the present invention to provide beverages and other beverage products. It is an object of at least certain embodiments of the invention (that is, not necessarily all embodiments of the invention) to provide beverages and other beverage products having desirable taste properties. It is an object of at least certain (but not necessarily all) embodiments of the invention to provide beverages and other beverage products having improved formulations. These and other objects, features and advantages of the invention or of certain embodiments of the invention will be apparent to those skilled in the art from the following disclosure and description of exemplary embodiments.

BRIEF SUMMARY

In accordance with a first aspect, a beverage, concentrate or other beverage product comprises at least one steviol glycoside sweetener and anisic acid. The beverage product can be a liquid that is ready to drink, a beverage concentrate that must be diluted before consumption, or any other suitable form of beverage. Anisic acid is present in sufficient amount to effectively mask a metallic aftertaste of the steviol glycoside sweetener. In certain exemplary embodiments the beverage is substantially clear. As used here, substantially clear means that the beverage has substantially no turbidity and substantially no color. In certain exemplary embodiments the beverage is a cola beverage, that is, a carbonated beverage having a typical cola flavor and acidity. In certain exemplary embodiments the beverage is a tea beverage, that is, a beverage having a tea component, optionally also having additional flavor(s) with the tea flavor.

The steviol glycosides, e.g., rebaudiosides such as Rebaudioside A, stevioside, etc. are natural, non-nutritive, potent sweeteners. These compounds can be obtained by extraction or the like from the stevia plant. Stevia (e.g., Stevia rebaudiana bectoni) is a sweet-tasting plant. The leaves contain a complex mixture of natural sweet diterpene glycosides. Steviol glycosides, e.g., rebaudiosides such as Rebaudioside A, stevioside, etc. are some of the components of Stevia that contribute sweetness. Typically, these compounds are found to include stevioside (4-13% dry weight), steviolbioside (trace), and dulcoside A (0.4-0.7%).

A single steviol glycoside or a blend of them is present as a sweetener in the beverage products disclosed here. For convenience in this discussion, the term "steviol glycosides" is used in some instances to mean one or more steviol glycosides, unless otherwise clear from context. Any combination of steviol glycosides can be present in the beverage. The steviol glycosides can be present in relative proportion as found in the Stevia plant, or can be used in other proportions.

Steviol glycosides can be present in the beverage or other beverage product as the only sweetener, or as one of a plurality of sweeteners. The concentration of steviol glycosides is related to the desired sweetness level, and varies with the desired taste to be achieved and the type of beverage product. Typically, the total concentration of steviol glycosides in a ready to drink beverage is on the order of milligrams per fluid ounce. Thus, typically, the total concentration of steviol glycosides in a ready to drink beverage is the concentration suitable to provide sweetness equivalent to about 1 to 10 degrees Brix of sugar, e.g. between about 0.5 and 10 mg/fl.oz of the steviol glycoside.

The steviol glycosides, while providing natural, non-nutritive, potent sweetening, are found by some consumers in certain beverage product formulations to have (in addition to sweetness) what might be characterized as an off taste. This taste often is characterized or described as a metallic aftertaste, a metallic lingering taste in the mouth after the beverage is swallowed. That is, the metallic aftertaste is a flavor component sensed by the consumer after the beverage is consumed. In the beverage products and sweeteners disclosed here, this metallic aftertaste is masked with anisic acid. Thus, the anisic acid is used at least in an amount effective to mask all or a portion of the metallic aftertaste of the steviol glycosides present in the beverage product.

In accordance with another aspect, a beverage comprises water, a non-nutritive steviol glycoside sweetener having a metallic aftertaste and anisic acid present in an amount sufficient to mask the metallic aftertaste of the non-nutritive steviol glycoside sweetener.

In accordance with another aspect of the invention, a beverage concentrate or syrup for a beverage comprises anisic acid and at least a non-nutritive steviol glycoside sweetener having a metallic aftertaste, the anisic acid present in an amount sufficient to mask the metallic aftertaste of the non-nutritive steviol glycoside sweetener when the concentrate or syrup is mixed with a diluent to make a beverage.

In accordance with another aspect, a method comprises incorporating anisic acid in a beverage product or sweetener in an amount sufficient to mask the metallic aftertaste of a non-nutritive steviol glycoside sweetener. It should be understood that, as used here, the phrase "mask the metallic aftertaste of a non-nutritive steviol glycoside sweetener" (and similar phrases) means mask at least a portion of the metallic aftertaste, e.g., perceptibly mask the metallic aftertaste.

In accordance with another aspect, a method comprises the steps of 1) identifying a beverage formulation comprising at least one non-nutritive steviol glycoside sweetener with a metallic aftertaste, 2) adding anisic acid to the identified beverage formulation in an amount sufficient to mask the metallic aftertaste of the non-nutritive steviol glycoside sweetener, and 3) preparing a beverage according to the beverage formulation of step (2).

In accordance with another aspect of the invention, a reduced calorie sweetener comprises at least one non-nutritive steviol glycoside sweetener having a metallic aftertaste and anisic acid in an amount sufficient to mask the metallic aftertaste of the non-nutritive steviol glycoside sweetener. Such sweetener, for example, may be in the form of a powder, concentrated liquid, etc. In certain exemplary embodiments the sweetener is packaged into individual user servings, e.g., in an amount comparable in sweetening effect to a teaspoon of granulated sugar.

It will be appreciated by those skilled in the art, given the benefit of the following description of certain exemplary embodiments of the beverage and other beverage products disclosed here, that at least certain embodiments of the invention have improved or alternative formulations suitable to provide desirable taste profiles, nutritional characteristics, etc. These and other aspects, features and advantages of the invention or of certain embodiments of the invention will be further understood by those skilled in the art from the following description of exemplary embodiments.

DETAILED DESCRIPTION OF CERTAIN EXEMPLARY EMBODIMENTS

It should be understood that beverages and other beverage products in accordance with this disclosure may have any of numerous different specific formulations or constitutions. The formulation of a beverage product in accordance with this disclosure can vary to a certain extent, depending upon such factors as the product's intended market segment, its desired nutritional characteristics, flavor profile and the like. For example, it will generally be an option to add further ingredients to the formulation of a particular beverage embodiment, including any of the beverage formulations described below. Additional (i.e., more and/or other) sweeteners may be added, flavorings, electrolytes, vitamins, fruit juices or other fruit products, tastants, masking agents and the like, flavor enhancers, and/or carbonation typically can be added to any such formulations to vary the taste, mouthfeel, nutritional characteristics, etc. In general, a beverage in accordance with this disclosure typically comprises at least water, sweetener, and flavoring, and typically also acidulant, coloring, and/or carbonation. Exemplary flavorings which may be suitable for at least certain formulations in accordance with this disclosure include cola flavoring, citrus flavoring, spice flavorings and others. Carbonation in the form of carbon dioxide may be added for effervescence. Preservatives can be added if desired, depending upon the other ingredients, production technique, desired shelf life, etc. Optionally, caffeine can be added. Certain exemplary embodiments of the beverages disclosed here are cola-flavored carbonated beverages, characteristically containing carbonated water, sweetener, kola nut extract and/or other flavoring, caramel coloring, phosphoric acid, and optionally other ingredients. Additional and alternative suitable ingredients will be recognized by those skilled in the art given the benefit of this disclosure.

The beverage products disclosed here include beverages, i.e., ready to drink liquid formulations, beverage concentrates and the like. Beverages include, e.g., carbonated and non-carbonated soft drinks, fountain beverages, frozen ready-to-drink beverages, coffee beverages, tea beverages, dairy beverages, powdered soft drinks, as well as liquid concentrates, flavored waters, enhanced waters, fruit juice and fruit juice-flavored drinks, sport drinks, and alcoholic products. The terms "beverage concentrate" and "syrup" are used interchangeably throughout this disclosure. At least certain exemplary embodiments of the beverage concentrates contemplated are prepared with an initial volume of water to which the additional ingredients are added. Full strength beverage compositions can be formed from the beverage concentrate by adding further volumes of water to the concentrate. Typically, for example, full strength beverages can be prepared from the concentrates by combining approximately 1 part concentrate with between approximately 3 to approximately 7 parts water. In certain exemplary embodiments the full strength beverage is prepared by combining 1 part concentrate with 5 parts water. In certain exemplary embodiments the additional water used to form the full strength beverages is carbonated water. In certain other embodiments, a full strength beverage is directly prepared without the formation of a concentrate and subsequent dilution.

Water is a basic ingredient in the beverages disclosed here, typically being the vehicle or primary liquid portion in which the remaining ingredients are dissolved, emulsified, suspended or dispersed. Purified water can be used in the manufacture of certain embodiments of the beverages disclosed here, and water of a standard beverage quality can be employed in order not to adversely affect beverage taste, odor, or appearance. The water typically will be clear, colorless, free from objectionable minerals, tastes and odors, free from organic matter, low in alkalinity and of acceptable microbiological quality based on industry and government standards applicable at the time of producing the beverage. In certain typical embodiments, water is present at a level of from about 80% to about 99.9% by weight of the beverage. In at least certain exemplary embodiments the water used in beverages and concentrates disclosed here is "treated water," which refers to water that has been treated to reduce the total dissolved solids of the water prior to optional supplementation, e.g., with calcium as disclosed in U.S. Pat. No. 7,052,725. Methods of producing treated water are known to those of ordinary skill in the art and include deionization, distillation, filtration and reverse osmosis ("r-o"), among others. The terms "treated water," "purified water," "demineralized water," "distilled water," and "r-o water" are understood to be generally synonymous in this discussion, referring to water from which substantially all mineral content has been removed, typically containing no more than about 500 ppm total dissolved solids, e.g. 250 ppm total dissolved solids.

Certain exemplary embodiments of the beverage products and sweeteners in accordance with this disclosure include, as sweetener component, only steviol glycosides. Other embodiments include other sweeteners, in addition to the steviol glycosides. Such other sweeteners suitable for use in various embodiments of the beverage products or sweeteners disclosed here include, e.g., potent and non-potent sweeteners, nutritive and non-nutritive sweeteners, natural and artificial or synthetic sweeteners. Suitable sweeteners and combinations of sweeteners are selected for the desired nutritional characteristics, taste profile for the beverage, mouthfeel and other organoleptic factors.

As used herein, "taste" refers to a combination of sweetness perception, temporal effects of sweetness perception, i.e., on-set and duration, off-tastes, e.g. bitterness and metallic taste, residual perception (aftertaste) and tactile perception, e.g. body and thickness. As used herein, a "full-calorie" beverage formulation is one fully sweetened with a nutritive sweetener. The term "nutritive sweetener" refers generally to sweeteners which provide significant caloric content in typical usage amounts, e.g., more than about 5 calories per 8 oz. serving of beverage. As used herein, a "potent sweetener" means a sweetener which is at least twice as sweet as sugar, that is, a sweetener which on a weight basis requires no more than half the weight of sugar to achieve an equivalent sweetness. For example, a potent sweetener may require less than one-half the weight of sugar to achieve an equivalent sweetness in a beverage sweetened to a level of 10 degrees Brix with sugar. Potent sweeteners include both nutritive (e.g., Lo Han Guo juice concentrate) and non-nutritive sweeteners (e.g., typically, Lo Han Guo powder). In addition, potent sweeteners include both natural potent sweeteners (e.g., steviol glycosides, Lo Han Guo, etc.) and artificial potent sweeteners (e.g., neotame, etc.). However, for natural beverage products disclosed here, only natural potent sweeteners are employed. Commonly accepted potency figures for certain potent sweeteners include, for example,

| | |
|---|---|
| Cyclamate | 30 times as sweet as sugar |
| Stevioside | 100-250 times as sweet as sugar |
| Mogroside V | 100-300 times as sweet as sugar |
| Rebaudioside A | 150-300 times as sweet as sugar |
| Acesulfame-K | 200 times as sweet as sugar |
| Aspertame | 200 times as sweet as sugar |
| Saccharine | 300 times as sweet as sugar |
| Neohesperidin dihydrochalcone | 300 times as sweet as sugar |
| Sucralose | 600 times as sweet as sugar |
| Neotame | 8,000 times as sweet as sugar |

As used herein, a "non-nutritive sweetener" is one which does not provide significant caloric content in typical usage amounts, i.e., is one which imparts less than 5 calories per 8 oz. serving of beverage to achieve the sweetness equivalent of 10 Brix of sugar. As used herein, "reduced calorie beverage" means a beverage having at least a 25% reduction in calories per 8 oz. serving of beverage as compared to the full calorie version, typically a previously commercialized full-calorie version. As used herein, a "low-calorie beverage" has fewer than 40 calories per 8 oz. serving of beverage. As used herein, "zero-calorie" or "diet" means having less than 5 calories per serving, e.g., per 8 oz. for beverages.

Non-nutritive sweeteners suitable for at least certain exemplary embodiments include, for example, peptide based sweeteners, e.g., aspartame, neotame, and alitame, and non-peptide based sweeteners, for example, sodium saccharin, calcium saccharin, acesulfame (including but not limited to acesulfame potassium), cyclamate (including but not limited to sodium cyclamate and/or calcium cyclamate), neohesperidin dihydrochalcone, and sucralose. Alitame may be less desirable for caramel-containing beverages where it has been known to form a precipitate. In certain exemplary embodiments the beverage product employs aspartame as the sweetener, either alone or with other sweeteners. In certain other exemplary embodiments the sweetener comprises aspartame and acesulfame potassium. Other non-nutritive sweeteners suitable for at least certain exemplary embodiments include, for example sorbitol, mannitol, xylitol, glycyrrhizin, neohesperidin dihydrochalcone, D-tagatose, erythritol, meso-erythritol, malitol, maltose, lactose, fructo-oligosaccharides, Lo Han Guo, ("LHG"), rebaudiosides, e.g. rebaudioside A, other dipeptides such as alitame, neotame, and aspartame, acesulfame, sucralose, saccharin, xylose, arabinose, isomalt, lactitol, maltitol, trehalulose, and ribose, and protein sweeteners such as thaumatin, monatin, monellin, brazzein, L-alanine and glycine, related compounds, and mixtures of any of them. Steviol glycosides, rebaudiosides, Lo Han Guo and related compounds, as discussed further below, are natural non-nutritive potent sweeteners. It will be within the ability of those skilled in the art, given the benefit of this disclosure, to select suitable non-nutritive sweetener (e.g., one or combination of non-nutritive sweeteners, either alone or together with nutritive sweetener) for use with the steviol glycoside sweetener component for particular embodiments of the beverage products disclosed here.

Certain exemplary embodiments of the beverage products and sweeteners disclosed here comprise nutritive sweetener in addition to the steviol glycosides sweetener, either with or without other sweeteners. The term "nutritive sweetener" refers generally to sweeteners which provide significant caloric content in typical usage amounts, e.g., more than about 5 calories per 8 oz. serving of beverage. As used herein, a "non-nutritive sweetener" is one which does not provide significant caloric content in typical usage amounts, i.e. less than about 1 calorie per 8 oz serving of beverage. A "low-calorie" sweetener imparts sweetness to a beverage and has a caloric content of less than about 4.0 cal/g, or provides less than 40 calories per 8 oz serving of beverage. As used herein, "zero-calorie" means having less than 5 calories per serving, e.g., per 8 oz. for beverages. As used herein, "diet" refers to either "zero-calorie" or "low-calorie" beverage products. As used herein, a "full-calorie" beverage formulation is one fully sweetened with a nutritive sweetener.

In at least certain exemplary embodiments of the beverages disclosed here, the sweetener component can include nutritive, natural crystalline or liquid sweeteners such as sucrose, liquid sucrose, fructose, liquid fructose, glucose, liquid glucose, glucose-fructose syrup from natural sources such as apple, chicory, honey, etc., e.g., high fructose corn syrup, invert sugar, maple syrup, maple sugar, honey, brown sugar molasses, e.g., cane molasses, such as first molasses, second molasses, blackstrap molasses, and sugar beet molasses, sorghum syrup, and/or others. Such sweeteners are present in at least certain exemplary embodiments in an amount of from about 0.1% to about 20% by weight of the beverage, such as from about 6% to about 16% by weight, depending upon the desired level of sweetness for the beverage. To achieve desired beverage uniformity, texture and taste, in certain exemplary embodiments of the natural beverage products disclosed here, standardized liquid sugars as are commonly employed in the beverage industry can be used. Typically such standardized sweeteners are free of traces of nonsugar solids which could adversely affect the flavor, color or consistency of the beverage.

The sweeteners are edible consumables suitable for consumption and for use in beverages. By "edible consumables" is meant a food or beverage or an ingredient of a food or beverage for human or animal consumption. The sweetener or sweetening agent used here and in the claims can be a nutritive or non-nutritive, natural or synthetic beverage ingredient or additive (or mixtures of them) which provides sweetness to the beverage, i.e., which is perceived as sweet by the sense of taste. The perception of flavoring agents and sweetening agents may depend to some extent on the interrelation of elements. Flavor and sweetness may also be perceived separately, i.e., flavor and sweetness perception may be both dependent upon each other and independent of each other. For example, when a large amount of a flavoring agent is used, a small amount of a sweetening agent may be readily perceptible and vice versa. Thus, the oral and olfactory interaction between a flavoring agent and a sweetening agent may involve the interrelationship of elements.

It should be understood, that the term "reduced calorie" as used here in reference to a beverage means a beverage having a lower caloric content than a corresponding beverage of the same formulation and sweetness but sweetened entirely with a nutritive sweetener such as sucrose. The correlative meaning applies to beverage concentrates and other beverage products disclosed here.

The term "nutritive sweetener" refers generally to sweeteners which provide significant caloric content in typical usage amounts, e.g., more than about 5 calories per 8 oz. serving of beverage. As used herein, a "full-calorie" beverage formulation is one fully sweetened with a nutritive sweetener.

Non-nutritive, high potency sweeteners typically are employed at a level of milligrams per fluid ounce of beverage, according to their sweetening power, any applicable regulatory provisions of the country where the beverage is to be marketed, the desired level of sweetness of the beverage, etc. It will be within the ability of those skilled in the art, given the benefit of this disclosure, to select suitable additional or alternative sweeteners for use in various embodiments of the beverage products disclosed here.

As mentioned above, steviol glycosides in certain exemplary embodiments are the only compounds used to sweeten the beverages, and in other embodiments are used in combination with other nutritive and/or non-nutritive sweeteners in the product formulation. The stevioside compounds can be obtained by extraction or the like from the stevia plant. Stevia (e.g., Stevia rebaudiana bectoni) is a sweet-tasting plant. The leaves contain a complex mixture of natural sweet diterpene glycosides. Steviol glycosides are components of Stevia that contribute sweetness. Steviol glycosides and rebaudiosides are components of Stevia that contribute sweetness. Typically, these compounds are found to include stevioside (4-13% dry weight), steviolbioside (trace), the rebaudiosides, including rebaudioside A (2-4%), rebaudioside B (trace), rebaudioside C (1-2%), rebaudioside D (trace), and rebaudioside E (trace), and dulcoside A (0.4-0.7%). The following nonsweet constituents also have been identified in the leaves of stevia plants: labdane, diterpene, triterpenes, sterols, flavonoids, volatile oil constituents, pigments, gums and inorganic matter.

Anisic acid can be natural or synthetic, and it should be understood that, as used here, the term anisic acid includes suitable, edible salts or other derivatives or modified forms of anisic acid. Natural anisic acid can be derived from the oil of anise seeds in accordance with techniques known to those of ordinary skill in the art. Anise has a delicate fragrance and the taste of anise is aromatic and sweetish. Oxidation of the oil from anise seeds yields anisic acid. Anisic acid can be used in the beverages disclosed here in any suitable amount or concentration effective to achieve the level of taste modification desired. Suitable concentrations typically are within the range of about 50 ppt (parts per trillion) to about 500 ppm (parts per million), e.g., about 1 ppm to about 250 ppm. In at least certain exemplary embodiments of the beverage products disclosed here, vanillin is used in conjunction with the anisic acid. Vanillin can be used in the beverages disclosed here in any suitable amount or concentration effective to achieve the level of taste modification desired. Suitable concentrations typically are within the ranges recited here for the anisic acid component.

A drawback of using non-nutritive steviol glycoside sweeteners is a metallic aftertaste. In accordance with this disclosure, anisic acid is added to a beverage, beverage concentrate or syrup, other beverage product or sweetener product. Anisic acid is added in an amount sufficient to mask the metallic aftertaste of the steviol glycoside sweetener. In certain embodiments, anisic acid is combined with the stevioside to make a reduced calorie sweetener. In other embodiments, anisic acid is combined with the steviol glycosides and with any or all of the following: other acids and alkaline agents to adjust the pH, a flavor composition selected from suitable natural and synthetic fruit flavors, botanical flavors, other flavors, and mixtures thereof, juices, other flavorings, carbon dioxide, caffeine, preservatives and other ingredients. Certain exemplary embodiments, typically incorporating water, provide a beverage, concentrate or syrup.

In addition to the anisic acid disclosed above, other acid can be used in beverage products and sweeteners disclosed to serve any one or more of several functions, including, for example, lending tartness to the taste of the beverage, enhancing palatability, increasing thirst quenching effect, modifying sweetness and acting as a mild preservative. Suitable such acids are known, generally, and the manner of their use in the present beverage products and sweeteners will be apparent to those skilled in the art given the benefit of this disclosure. Exemplary such acids suitable for use in some or all embodiments of the beverage products disclosed here include phosphoric acid, citric, malic, tartaric, lactic, formic, ascorbic, gluconic, succinic, maleic and adipic and mixtures of any of them. The acid can be used in solution form, for example, and in an amount sufficient to provide the desired pH of the beverage. Typically, for example, the one or more acids of the acidulant are used in amount, collectively, of from about 0.01% to about 1.0% by weight of the beverage, e.g., from about 0.05% to about 0.5% by weight of the beverage, such as 0.1% to 0.25% by weight of the beverage, depending upon the acidulant used, desired pH, other ingredients used, etc. The pH of at least certain exemplary embodiments of the beverages disclosed here can be a value within the range of from about 2.0 to about 5.0. The acid in certain exemplary embodiments enhances beverage flavor. Too much acid can impair the beverage flavor and result in sourness or other off-taste, while too little acid can make the beverage taste flat.

The particular acid or acids chosen and the amount used will depend, in part, on the other ingredients, the desired shelf life of the beverage product, as well as effects on the beverage pH, titratable acidity, and taste. Those skilled in the art, given the benefit of this disclosure, will recognize that when preparing beverage products containing peptide-based artificial sweeteners such as aspartame, the resulting beverage composition is best maintained below a certain pH to retain the sweetening effect of the artificial sweetener. In the formation of calcium-supplemented beverages, the presence of calcium salts increases the pH which requires additional acids to both assist the dissolution of the salt and maintain a desirable pH for stability of the artificial sweetener. The presence of the additional acid in the beverage composition, which increases the titratable acidity of the composition, will result in a more tart or sour taste to the resulting beverage. It will be within the ability of those skilled in the art, given the benefit of this disclosure, to select a suitable acid or combination of acids and the amounts of such acids for the acidulant component of any particular embodiment of the beverage products disclosed here.

Certain exemplary embodiments of the beverage products disclosed here also may contain small amounts of alkaline agents to adjust pH. Such agents include, e.g., potassium hydroxide, sodium hydroxide and potassium carbonate. For example, the alkaline agent potassium hydroxide may be used in an amount of from about 0.02 to about 0.04% by weight, with an amount of about 0.03% being typical for certain beverages. The amount will depend, of course, on the type of alkaline agents and on the degree to which the pH is to be adjusted.

The beverage products disclosed here optionally contain a flavor composition, for example, natural and synthetic fruit flavors, botanical flavors, other flavors, and mixtures thereof. As used here, the term "fruit flavor" refers generally to those flavors derived from the edible reproductive part of a seed plant. Included are both those wherein a sweet pulp is associated with the seed, e.g., banana, tomato, cranberry and the like, and those having a small, fleshy berry. The term berry also is used here to include aggregate fruits, i.e., not "true" berries, but fruit commonly accepted as such. Also included within the term "fruit flavor" are synthetically prepared flavors made to simulate fruit flavors derived from natural sources. Examples of suitable fruit or berry sources include whole berries or portions thereof, berry juice, berry juice concentrates, berry purees and blends thereof, dried berry powders, dried berry juice powders, and the like.

Exemplary fruit flavors include the citrus flavors, e.g., orange, lemon, lime, grapefruit, tangerine, mandarin orange, tangelo, and pomelo in all citrus recitations, and such flavors as apple, grape, cherry, and pineapple flavors and the like, and mixtures thereof. In certain exemplary embodiments the beverage concentrates and beverages comprise a fruit flavor component, e.g., a juice concentrate or juice. As used here, the term "botanical flavor" refers to flavors derived from parts of a plant other than the fruit. As such, botanical flavors can include those flavors derived from essential oils and extracts of nuts, bark, roots and leaves. Also included within the term "botanical flavor" are synthetically prepared flavors made to simulate botanical flavors derived from natural sources. Examples of such flavors include cola flavors, tea flavors, and the like, and mixtures thereof. The flavor component can further comprise a blend of various of the above-mentioned flavors. In certain exemplary embodiments of the beverage concentrates and beverages a cola flavor component is used or a tea flavor component. The particular amount of the flavor component useful for imparting flavor characteristics to the beverages of the present invention will depend upon the flavor (s) selected, the flavor impression desired, and the form of the flavor component. Those skilled in the art, given the benefit of this disclosure, will be readily able to determine the amount of any particular flavor component(s) used to achieve the desired flavor impression.

Juices suitable for use in at least certain exemplary embodiments of the beverage products disclosed here include, e.g., fruit, vegetable and berry juices. Juices can be employed in the present invention in the form of a concentrate, puree, single-strength juice, or other suitable forms. The term "juice" as used here includes single-strength fruit, berry, or vegetable juice, as well as concentrates, purees, milks, and other forms. Multiple different fruit, vegetable and/or berry juices can be combined, optionally along with other flavorings, to generate a beverage having the desired flavor. Examples of suitable juice sources include plum, prune, date, currant, fig, grape, raisin, cranberry, pineapple, peach, banana, apple, pear, guava, apricot, Saskatoon berry, blueberry, plains berry, prairie berry, mulberry, elderberry, Barbados cherry (acerola cherry), choke cherry, date, coconut, olive, raspberry, strawberry, huckleberry, loganberry, currant, dewberry, boysenberry, kiwi, cherry, blackberry, quince, buckthorn, passion fruit, sloe, rowan, gooseberry, pomegranate, persimmon, mango, rhubarb, papaya, litchi, lemon, orange, lime, tangerine, mandarin and grapefruit etc. Numerous additional and alternative juices suitable for use in at least certain exemplary embodiments will be apparent to those skilled in the art given the benefit of this disclosure. In the beverages of the present invention employing juice, juice may be used, for example, at a level of at least about 0.2% by weight of the beverage. In certain exemplary embodiments juice is employed at a level of from about 0.2% to about 40% by weight of the beverage. Typically, juice can be used, if at all, in an amount of from about 1% to about 20% by weight.

Certain such juices which are lighter in color can be included in the formulation of certain exemplary embodiments to adjust the flavor and/or increase the juice content of the beverage without darkening the beverage color. Examples of such juices include apple, pear, pineapple, peach, lemon, lime, orange, apricot, grapefruit, tangerine, rhubarb, cassis, quince, passion fruit, papaya, mango, guava, litchi, kiwi, mandarin, coconut, and banana. Deflavored and decolored juices can be employed if desired.

Other flavorings suitable for use in at least certain exemplary embodiments of the beverage products disclosed here include, e.g., spice flavorings, such as cassia, clove, cinnamon, pepper, ginger, vanilla spice flavorings, cardamom, coriander, root beer, sassafras, ginseng, and others. Numerous additional and alternative flavorings suitable for use in at least certain exemplary embodiments will be apparent to those skilled in the art given the benefit of this disclosure. Flavorings can be in the form of an extract, oleoresin, juice concentrate, bottler's base, or other forms known in the art. In at least certain exemplary embodiments, such spice or other flavors complement that of a juice or juice combination.

The one or more flavorings can be used in the form of an emulsion. A flavoring emulsion can be prepared by mixing some or all of the flavorings together, optionally together with other ingredients of the beverage, and an emulsifying agent. The emulsifying agent may be added with or after the flavorings mixed together. In certain exemplary embodiments the emulsifying agent is water-soluble. Exemplary suitable emulsifying agents include gum acacia, modified starch, carboxymethylcellulose, gum tragacanth, gum ghatti and other suitable gums. Additional suitable emulsifying agents will be apparent to those skilled in the art of beverage formulations, given the benefit of this disclosure. The emulsifier in exemplary embodiments comprises greater than about 3% of the mixture of flavorings and emulsifier. In certain exemplary embodiments the emulsifier is from about 5% to about 30% of the mixture.

Carbon dioxide is used to provide effervescence to certain exemplary embodiments of the beverages disclosed here. Any of the techniques and carbonating equipment known in the art for carbonating beverages can be employed. Carbon dioxide can enhance the beverage taste and appearance and can aid in safeguarding the beverage purity by inhibiting and destroying objectionable bacteria. In certain embodiments, for example, the beverage has a $CO_2$ level up to about 7.0 volumes carbon dioxide. Typical embodiments may have, for example, from about 0.5 to 5.0 volumes of carbon dioxide. As used here and independent claims, one volume of carbon dioxide is defined as the amount of carbon dioxide absorbed by any given quantity of water at 60° F. (16° C.) and atmospheric pressure. A volume of gas occupies the same space as does the water by which it is absorbed. The carbon dioxide content can be selected by those skilled in the art based on the desired level of effervescence and the impact of the carbon dioxide on the taste or mouthfeel of the beverage. The carbonation can be natural or synthetic.

Optionally, caffeine can be added to various embodiments of the beverages disclosed here. The amount of caffeine added is determined by the desired beverage properties, any applicable regulatory provisions of the country where the beverage is to be marketed, etc. In certain exemplary embodiments caffeine is included at a level of 0.02 percent or less by weight of the beverage. The caffeine must be of a purity acceptable for use in foods and beverages. The caffeine can be natural or synthetic in origin.

The beverage concentrates and beverages disclosed here may contain additional ingredients, including, generally, any of those typically found in beverage formulations. These additional ingredients, for example, can typically be added to a stabilized beverage concentrate. Examples of such additional ingredients include, but are not limited to, caffeine, caramel and other coloring agents or dyes, antifoaming agents, gums, emulsifiers, tea solids, cloud components, and mineral and non-mineral nutritional supplements. Examples of non-mineral nutritional supplement ingredients are known to those of ordinary skill in the art and include, for example, antioxidants and vitamins, including Vitamins A, D, E (tocopherol), C (ascorbic acid), B (thiamine), $B_2$ (riboflavin), $B_6$, $B_{12}$, and K, niacin, folic acid, biotin, and combinations thereof. The optional non-mineral nutritional supplements are typically present in amounts generally accepted under good manufacturing practices. Exemplary amounts are between about 1% and about 100% RDV, where such RDV are established. In certain exemplary embodiments the non-mineral nutritional supplement ingredient(s) are present in an amount of from about 5% to about 20% RDV, where established.

Preservatives may be used in at least certain embodiments of the beverages disclosed here. That is, at least certain exemplary embodiments contain an optional dissolved preservative system. Solutions with a pH below 4 and especially those below 3 typically are "microstable," i.e., they resist growth of microorganisms, and so are suitable for longer term storage prior to consumption without the need for further preservatives. However, an additional preservative system can be used if desired. If a preservative system is used, it can be added to the beverage product at any suitable time during production, e.g., in some cases prior to the addition of the sweetener. As used here, the terms "preservation system" or "preservatives" include all suitable preservatives approved for use in food and beverage compositions, including, without limitation, such known chemical preservatives as benzoates, e.g., sodium, calcium, and potassium benzoate, sorbates, e.g., sodium, calcium, and potassium sorbate, citrates, e.g., sodium citrate and potassium citrate, Cinnamates, polyphosphates, e.g., sodium hexametaphosphate (SHMP), and mixtures thereof, and antioxidants such as ascorbic acid, EDTA, BHA, BHT, TBHQ, EMIQ, dehydroacetic acid, dimethyldicarbonate, ethoxyquin, heptylparaben, and combinations thereof. Preservatives can be used in amounts not exceeding mandated maximum levels under applicable laws and regulations. The level of preservative used typically is adjusted according to the planned final product pH, as well as an evaluation of the microbiological spoilage potential of the particular beverage formulation. The maximum level employed typically is about 0.05% by weight of the beverage. It will be within the ability of those skilled in the art, given the benefit of this disclosure, to select a suitable preservative or combination of preservatives for beverages according to this disclosure.

Other methods of beverage preservation suitable for at least certain exemplary embodiments of the beverage products disclosed here include, e.g., aseptic packaging and/or heat treatment or thermal processing steps, such as hot filling and tunnel pasteurization. Such steps can be used to reduce yeast, mold and microbial growth in the beverage products. For example, U.S. Pat. No. 4,830,862 to Braun et al. discloses the use of pasteurization in the production of fruit juice beverages as well as the use of suitable preservatives in carbonated beverages. U.S. Pat. No. 4,925,686 to Kastin discloses a heat-pasteurized freezable fruit juice composition which contains sodium benzoate and potassium sorbate. In general, heat treatment includes hot fill methods typically using high temperatures for a short time, e.g., about 190° F. for 10 seconds, tunnel pasteurization methods typically using lower temperatures for a longer time, e.g., about 160° F. for 10-15 minutes, and retort methods typically using, e.g., about 250° F. for 3-5 minutes at elevated pressure, i.e., at pressure above 1 atmosphere.

Along with the steviol glycoside(s) employed in the beverage products disclosed here, additional non-nutritive sweetener and/or nutritive sweetener can be used, including but not limited to rebaudioside A or others of the rebaudiosides, LHG and related compounds, and other natural or artificial sweeteners. A flavor additive for the beverage can be any suitable flavor additive, including but not limited to cola flavoring, lemon flavoring, lime flavoring, and lemon-lime flavoring available, e.g., from flavor manufacturers.

The principles disclosed here can be used to reduce the calories in regular beverage formulation by replacing nutritive sweeteners with non-nutritive sweeteners. By adding anisic acid, it has been discovered that natural non-nutritive stevioside sweeteners can be used, and the resulting beverage has good taste and mouthfeel.

Beverages prepared in accordance with this disclosure, incorporating one or more steviol glycoside, have less noticeable metallic taste, and are closer to the taste of a corresponding regular or full calorie beverage than corresponding beverage formulations that incorporate steviol glycoside(s) without anisic acid.

Those of ordinary skill in the art will understand that, for convenience, some ingredients are described here in certain cases by reference to the original form of the ingredient in which it is used in formulating or producing the beverage product. Such original form of the ingredient may differ from the form in which the ingredient is found in the finished beverage product. Thus, for example, in certain exemplary embodiments of the beverage products according to this disclosure, sucrose and liquid sucrose would typically be substantially homogenously dissolved and dispersed in the beverage. Likewise, other ingredients identified as a solid, concentrate (e.g., juice concentrate), etc. would typically be homogenously dispersed throughout the beverage or throughout the beverage concentrate, rather than remaining in their original form. Thus, reference to the form of an ingredient of a beverage product formulation should not be taken as a limitation on the form of the ingredient in the beverage product, but rather as a convenient means of describing the ingredient as an isolated component of the product formulation.

Given the benefit of the above disclosure and description of exemplary embodiments, it will be apparent to those skilled in the art that numerous alternative and different embodiments are possible in keeping with the general principles of the invention disclosed here. Those skilled in this art will recognize that all such various modifications and alternative embodiments are within the true scope and spirit of the invention. The appended claims are intended to cover all such modifications and alternative embodiments. It should be understood that the use of a singular indefinite or definite article (e.g., "a," "an," "the," etc.) in this disclosure and in the following claims follows the traditional approach in patents of meaning "at least one" unless in a particular instance it is clear from context that the term is intended in that particular instance to mean specifically one and only one. Likewise, the term "comprising" is open ended, not excluding additional items, features, components, etc.

What is claimed is:

1. A beverage comprising:
   water;
   a sweetener consisting essentially of
      one or more steviol glycosides wherein at least one steviol glycoside is a sweetening amount of Rebaudioside D, and
      optionally one or more nutritive sweeteners;
   anisic acid present in an amount sufficient to mask a metallic aftertaste of the one or more steviol glycosides.

2. The beverage of claim 1, wherein the beverage is selected from the group consisting of a carbonated soft drink, a non-carbonated soft drink, a fountain beverage, a frozen ready-to-drink beverage, a coffee beverage, a tea beverage, a dairy beverage, a flavored water, an enhanced water, a fruit juice, a fruit juice-flavored drink, a sport drink, and an alcoholic beverage.

3. The beverage of claim 1 further comprising cola flavoring and acidulant effective to provide a beverage pH of 3.0 to 5.0, and wherein the beverage is carbonated.

4. The beverage of claim 2, wherein the beverage is clear.

5. The beverage of claim 1 further comprising a tea component effective to provide a tea flavor to the beverage.

6. The beverage of claim 1 wherein the anisic acid is used in an amount of 50 ppt (parts per trillion) to about 500 ppm (parts per million).

7. The beverage of claim 1 further comprising vanillin.

8. The beverage of claim 7 wherein vanillin is used in an amount of 50 ppt (parts per trillion) to about 500 ppm (parts per million).

9. A beverage concentrate, comprising:
   a sweetener consisting essentially of
      one or more steviol glycosides wherein at least one steviol glycoside is a sweetening amount of Rebaudioside D, and
      optionally one or more nutritive sweeteners;
   anisic acid present in an amount sufficient to mask a metallic aftertaste of the steviol glycosides when the beverage concentrate is mixed with a diluent to make a beverage.

10. A beverage comprising the beverage concentrate of claim 9 diluted with water.

11. The beverage of claim 10, wherein the beverage is selected from the group consisting of a carbonated soft drink, a non-carbonated soft drink, a fountain beverage, a frozen ready-to-drink beverage, a coffee beverage, a tea beverage, a dairy beverage, a flavored water, an enhanced water, a fruit juice, a fruit juice-flavored drink, a sport drink, and an alcoholic beverage.

12. A method of masking the metallic aftertaste of a sweetener consisting essentially of
   one or more steviol glycosides wherein at least one steviol glycoside is a sweetening amount of Rebaudioside D, and
   optionally one or more nutritive sweeteners;
in a beverage product, comprising incorporating anisic acid in the beverage product in an amount sufficient to mask a metallic aftertaste of the steviol glycosides.

13. A method of preparing a beverage comprising:
   1) selecting a beverage formulation comprising a sweetener consisting essentially of
      one or more steviol glycosides wherein at least one steviol glycoside is a sweetening amount of Rebaudioside D, and
      optionally one or more nutritive sweeteners; and
   2) adding anisic acid to the beverage formulation in an amount sufficient to mask a metallic aftertaste of the steviol glycosides, of between 50 ppt (parts per trillion) to about 500 ppm (parts per million).

14. The method of claim 13 wherein the beverage formulation further comprises a flavoring component.

15. The method of claim 13 further comprising 3) adding vanillin to the beverage formulation in an amount between 50 ppt (parts per trillion) to about 500 ppm (parts per million).

16. A cola beverage comprising:
   water;
   cola flavoring;
   an acidulant effective to provide a beverage pH of 3.0 to 5.0;
   a sweetener consisting essentially of
      one or more steviol glycosides wherein at least one steviol glycoside is a sweetening amount of Rebaudioside D, and
      optionally one or more nutritive sweeteners; and
   anisic acid present in an amount sufficient to mask a metallic aftertaste of the one or more steviol glycosides in the cola beverage.

17. The beverage of claim 16 wherein the acidulant is phosphoric acid.

18. The beverage of claim 16 wherein the beverage is carbonated.

19. The beverage of claim 16 wherein the anisic acid is used in an amount of 50 ppt (parts per trillion) to about 500 ppm (parts per million).

20. The beverage of claim 16 further comprising vanillin.

* * * * *